(12) United States Patent
Sahai et al.

(10) Patent No.: US 7,027,534 B2
(45) Date of Patent: Apr. 11, 2006

(54) EXTRACTING FINE-TUNED ESTIMATES FROM CORRELATION FUNCTIONS EVALUATED AT A LIMITED NUMBER OF VALUES

(75) Inventors: Anant Sahai, San Mateo, CA (US); John Tsitsiklis, Lexington, MA (US); Stefano Casadei, San Francisco, CA (US); Andrew Chou, San Mateo, CA (US); Benjamin Van Roy, San Mateo, CA (US); Jesse Robert Stone, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 863 days.

(21) Appl. No.: 09/888,338

(22) Filed: Jun. 22, 2001

(65) Prior Publication Data

US 2003/0156665 A1    Aug. 21, 2003

(51) Int. Cl.
*H03D 1/00* (2006.01)
*H04L 27/06* (2006.01)

(52) U.S. Cl. ..................................... 375/343; 375/350
(58) Field of Classification Search ............... 375/343, 375/350
See application file for complete search history.

(56) References Cited

U.S. PATENT DOCUMENTS

| | | | | |
|---|---|---|---|---|
| 3,882,494 A * | 5/1975 | Bolger | .................. | 342/136 |
| 4,005,266 A * | 1/1977 | Lehr et al. | .................. | 375/356 |
| 4,518,256 A * | 5/1985 | Schwartz | .................. | 356/5.03 |
| 4,669,095 A * | 5/1987 | Hall | .................. | 375/336 |
| 5,491,726 A * | 2/1996 | Cheng et al. | .................. | 375/343 |
| 5,497,435 A * | 3/1996 | Berger | .................. | 382/249 |
| 5,663,734 A | 9/1997 | Krasner | .................. | 342/357 |
| 5,781,156 A | 7/1998 | Krasner | .................. | 342/357 |
| 6,137,847 A * | 10/2000 | Stott et al. | .................. | 375/344 |
| 6,219,345 B1 * | 4/2001 | Clark et al. | .................. | 370/337 |
| 6,324,227 B1 * | 11/2001 | Kang et al. | .................. | 375/343 |
| 6,373,861 B1 * | 4/2002 | Lee | .................. | 370/503 |

(Continued)

OTHER PUBLICATIONS

Tsui, James Bao-Yen, "Fundamentals of Global Positioning System Receivers: A Software Approach," Wiley, 2000, pp. 149-150.

(Continued)

*Primary Examiner*—Stephen Chin
*Assistant Examiner*—Jia Lu
(74) *Attorney, Agent, or Firm*—Edward C. Kwok; MacPherson Kwok Chen & Heid LLP

(57) ABSTRACT

Techniques are provided for fine-tuning estimates of a delay value for a sampled signal. One aspect of the invention is to perform, for the sampled signal, coarse-grained calculations of the In Phase and Quadrature (I and Q) correlation integrals at a limited number of points, wherein the calculations are performed over a range of hypothesized delay values. A range of delay values of interest are then determined from the coarse-grained calculations of the I and Q correlation integrals. A subset of I and Q values based on the coarse granularity calculations of the I and Q correlation functions is used to perform a time-domain interpolation to obtain fine-grained values of the I and Q integrals in the range of the delay values of interest. Magnitude calculations are performed based on the fine-grained values of the I and Q integrals. Fine-tuned estimates of delay value are based on the magnitude calculations. Alternatively, fine-tuned estimates of delay value are based on the template-matching approach.

65 Claims, 4 Drawing Sheets

U.S. PATENT DOCUMENTS

| | | | |
|---|---|---|---|
| 6,542,116 B1* | 4/2003 | Sahai et al. | 342/357.12 |
| 6,618,452 B1* | 9/2003 | Huber et al. | 375/343 |
| 6,735,243 B1* | 5/2004 | Akopian | 375/150 |
| 6,801,589 B1* | 10/2004 | Dogan | 375/343 |
| 2002/0110184 A1* | 8/2002 | Akopian et al. | 375/149 |
| 2002/0150182 A1* | 10/2002 | Dogan et al. | 375/343 |
| 2003/0156664 A1* | 8/2003 | Sahai et al. | 375/343 |
| 2004/0022332 A1* | 2/2004 | Gupta et al. | 375/343 |

OTHER PUBLICATIONS

Psiaki, Mark L., "Block Acquisition of Weak GPS Signals in a Software Receiver," Cornell University Presented at ION GPS 2001, Sep. 11-14, 2001, Salt Lake City, pp. 1-13.

* cited by examiner

EXTRACTING FINE-TUNED ESTIMATES FROM CORRELATION FUNCTIONS EVALUATED AT A LIMITED NUMBER OF VALUES

FIELD OF THE INVENTION

The present invention relates to signal processing and, more particularly, to techniques for extracting fine-tuned estimates from correlation functions evaluated at a limited number of values.

BACKGROUND OF THE INVENTION

In the context of signal processing, when a signal is transmitted to a receiving device, there is a certain amount of unknown delay associated with the propagation of the signal. The original signal is not received instantaneously at the receiving device. A calculated estimate of the delay associated with the received signal is generally limited to the resolution of the sampling rate of the received signal. For example, if the received signal can be represented as a continuous integrable function, x(t), then the received signal, which typically contains noise, may be converted to a discrete sequence of values in time through sampling. The discrete sequence of values is herein referred to as sampled data. As the sampling rate increases, the sampled data becomes a more accurate representation of x(t). Due to the finite sampling rate, the delay value that is calculated from the sampled data is not as precise as the delay value calculated from a continuous function.

In one approach, a more accurate delay value estimate may be obtained by adjusting the sampling times. For example, correlation calculations can be performed for a pair of delay values that produce equal values in the magnitude calculations of the correlation integrals. If the magnitude values corresponding to the pair of delay values are high enough, then it may be assumed that the peak magnitude, and hence the true time delay, lies halfway between the pair of delay values (used in the delay lock loop). However, a significant drawback with this approach is that it assumes that the sampling times can be adjusted, and that it is already known where to look approximately. If the sampling times cannot be adjusted, (i.e., the set of sampled data with which to work is fixed), then in general a different reference signal needs to be used in computing the correlation integrals at the different delay. It may not be enough to just time shift the reference by an integer number of samples. Another approach for estimating a delay value at a level of precision that is higher than the precision corresponding to the sampling rate, is to adopt a fine-grid for a hypothesized range of delay values. In such an approach, the sampled data is correlated against the reference signal by shifting the reference signal according to the fine gridding of delay values. The correlation between the received signal and the reference signal is performed by calculating the In Phase ("I") and Quadrature ("Q") correlation integrals for the range of hypothesized delay values, which is finely gridded, at the specified modulation frequency. But the finer the gridding of the search region gets, the more correlations must be computed. Thus, a disadvantage with using a fine grid for searching over the hypothesized range of delay values is that the high cost of computing the correlations, especially when there is a considerable amount of sampled data, (i.e., the sampling duration is long) can be computationally prohibitive. Based on the foregoing, there is a clear need for a technique for estimating the delay associated with a received signal in a cost effective fashion during signal processing.

A very similar problem arises when the received signal is modulated by an unknown frequency and one needs to derive a fine-tuned estimate of this frequency from a set of IQ correlations obtained by searching over a coarse-grained set of frequencies representing the uncertain region.

SUMMARY OF THE INVENTION

Techniques are provided for fine-tuning estimates of a delay value and other parameters of interest associated with a sampled signal. One aspect of the invention is to use, for the sampled signal, calculations of the In Phase and Quadrature (I and Q) correlation integrals at a limited number of coarsely spaced points, wherein the calculations are performed for a set $\Sigma_1$ of hypothesized delay values. These coarse-grained IQ correlations can be carried out by means of dedicated hardware, or the method described in U.S. patent application Ser. No. 09/888,227, filed on the same day herewith, entitled "Synthesizing Coherent Correlation Sums at One or Multiple Carrier Frequencies Using Correlation Sums Calculated at a Coarse Set of Frequencies", by inventors Anant Sahai and John Tsitsiklis, or any other possible way. A subset of I and Q correlation values based on the coarse granularity calculations of the I and Q correlation functions is used to perform an interpolation to obtain fine-grained values of the I and Q integrals in the range of the delay, or other parameter, values of interest. Searching over such interpolated values effectively produces correspondingly fine precision estimates of the delay, or other parameter, values in the range of interest.

Another approach used in this invention to calculate fine precision estimates is based on a template-matching approach whereby the received signal is compared with a parametric template.

This invention can also be used to estimate parameters other than the delay, such as the modulation frequency or other characteristics of the received signal.

In general, these estimates can be given in the form of a single optimal value, an interval, a collection of intervals or a set of values.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for fine-tuning estimates of a delay and other parameter values associated with a sampled signal. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
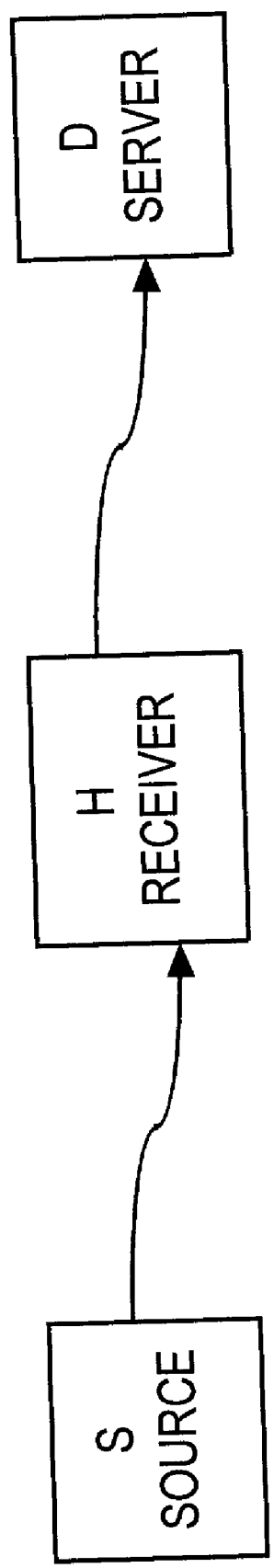
FIG. 1 is a block diagram that illustrates a system overview for processing a signal.

FIG. 1 is a block diagram that illustrates a system overview for processing a signal. System 100 comprises a signal source S, a receiver H, and a server D. In this example, the analog signal is transmitted to receiver H. The signal that is received at H is herein referred to as a "received signal". It is assumed that there is an unknown delay from the time the analog signal leaves signal source S and when it is received at receiver H. Such a delay is herein referred to as a "delay value". In one embodiment of the invention, receiver H converts the analog signal into discrete sequence of values as a function of time by digitizing the received signal. The digitized received signal is herein referred to as a "sampled signal" or "sampled data". In one embodiment, receiver H transmits the sampled data to server D for processing. For the purpose of explanation, signal source S may be a transmitter or beacon like a Global Positioning System (GPS) satellite vehicle from a set of GPS satellite vehicles that is overhead the location of receiver H. Examples of receivers are Global Positioning System receivers, cell phones with embedded signal receivers, Personal Digital Assistants (PDAs) with embedded signal receivers, etc. Further, in certain embodiments, receiver H may transmit the sampled data to a base station (not shown in FIG. 1), which in turn transmits the sampled data to server D for processing, as further described in U.S. patent application Ser. No. 09/730,324, filed Dec. 4, 2000, entitled "Methods and Apparatus for Determining Location Using a Thin-Client", by inventors Benjamin Van Roy, Andrew Chou and Sherk Chung Functional and Operational Overview This invention reduces the amount of computation needed to calculate fine precision estimates of the delay (or other parameters such as the exact Doppler shift) of the signal by means of a two-stage approach. Although the description here focuses on estimating delay, one of ordinary skill in the art should see how to use this invention to estimate other parameters of interest. The first stage considers only a coarse set of possible delay values and produces one or more approximate delay estimates. The strength or likelihood of candidate delay values is evaluated either directly by the square-magnitude of the IQ correlations, $I^2+Q^2$, or by comparing the IQ correlations with a template (template-matching method). The IQ correlations are standard In-phase and Quadrature correlations of the sampled signal with a suitably modulated reference signal representing the known signal being searched for.

The second stage refines these approximate delay estimates by performing either an interpolation or finer template-matching operation in a neighborhood of these coarse estimates. It avoids the expense of recalculating the IQ correlations at the finer resolution.

Determining Fine-tuned Estimates of Delay Values

Figure 2:
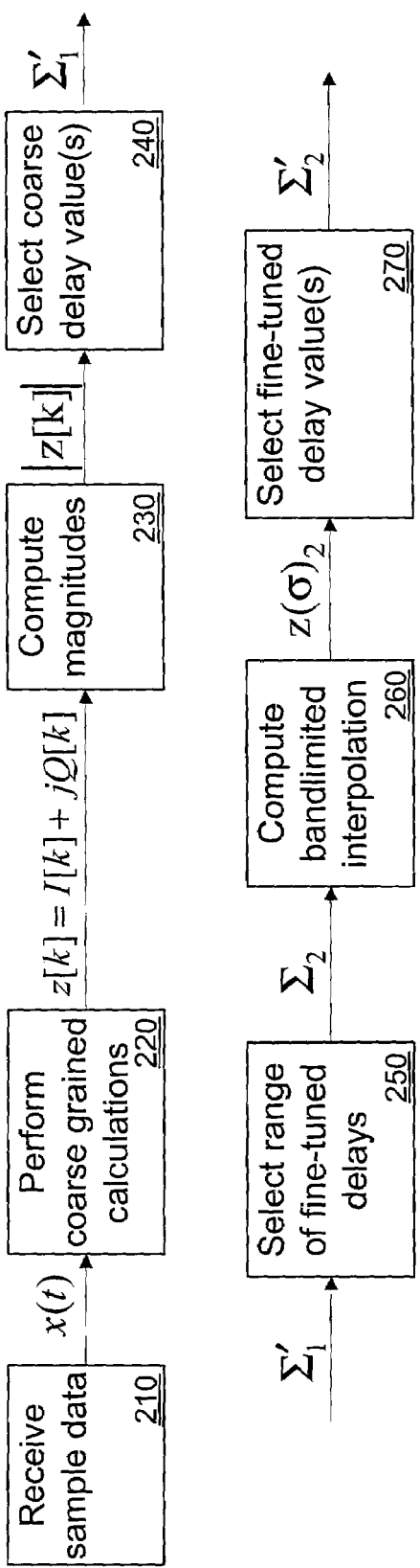
FIG. 2 is a flowchart that illustrates a technique for fine-tuning estimates of delay in time associated with a received signal.
Figure 3:
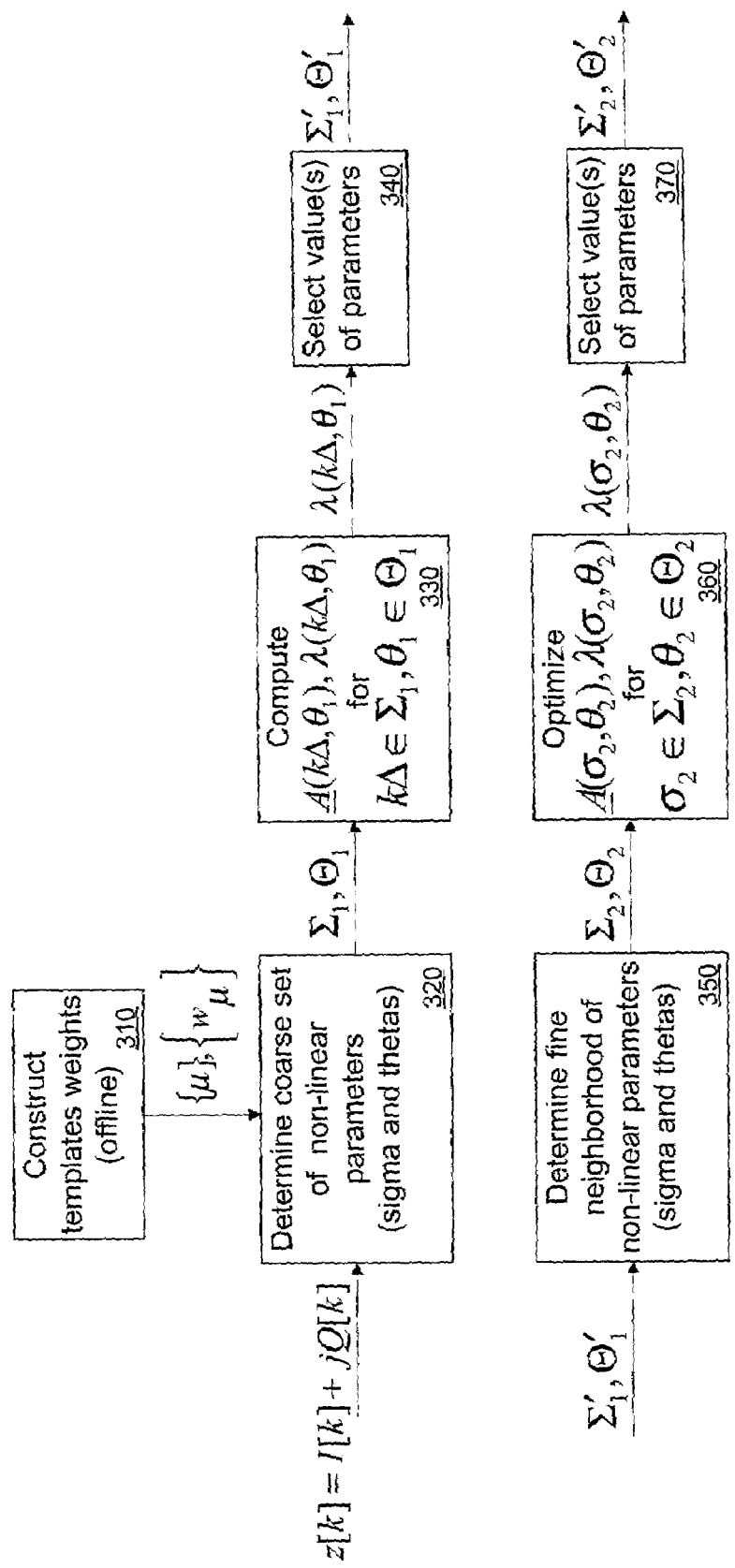
FIG. 3 is a flowchart that illustrates a template-based approach to calculate fine-tuned estimates of the delay and other parameters.

FIG. 2 is a flowchart that illustrates the simplest embodiment of a technique for fine-tuning estimates of delay values associated with a received signal that is received in accordance with block 210 of FIG. 2. FIG. 3 illustrates the technique based on template-matching. In certain embodiments of the invention, server D performs the steps as described herein with reference to FIG. 2 and FIG. 3.

Coarse IQ Correlation: At block 220, coarse-grained calculations of IQ correlation integrals are performed for the sampled data at a set $\Sigma_1$ of hypothesized delay values. The determination of a range of hypothesized delay values can be based on the uncertainty in certain basic variables like space and time, or might be known from other sources depending on the application at hand. Determining this range is further described in U.S. patent application Ser. No. 09/888,229, filed on the same day herewith, entitled "Determining the Spatio-Temporal and Kinematic Parameters of a Signal Receiver and Its Clock by Information Fusion", by inventors Anant Sahai, Andrew Chou, Wallace Mann and Stefano Casadei, now U.S. Pat. No. 6,542,116. In one embodiment of the invention, described further in U.S. patent application Ser. No. 09/888,228, filed on the same day herewith, entitled "Signal Acquisition Using Data Bit Information", by inventors Anant Sahai, Wallace Mann, Andrew Chou and Benjamin Van Roy, now U.S. Pat. No. 6,512,479, the coarse-grained calculations are carried out together by dividing the sampled signal into a plurality of blocks of data. Alternatively, the coarse-grained calculations can be carried out individually in the direct manner well known to those skilled in the art.

The coarse-grained IQ correlations can also be carried out by means of dedicated hardware, or the approximate method described in U.S. patent application Ser. No. 09/888,228, filed on the same day herewith, entitled "Synthesizing Coherent Correlation Sums at One or Multiple Carrier Frequencies Using Correlation Sums Calculated at a Coarse Set of Frequencies", by inventors Anant Sahai and John Tsitsiklis, or by any other known technique.

The underlying IQ correlations at hypothesized delay $\tau$ are denoted by the complex signal $z(\tau)=I(\tau)+jQ(\tau)$. The coarse-grained IQ correlations can be represented by a discrete sequence $z[k]$ of complex numbers where the k-th point in the sequence is $z(\tau)$ evaluated at $\tau=k\Delta$ where $\Delta$ denotes the inter-sample time.

Magnitudes: At block 230, the magnitudes $|z[k]|=\sqrt{I^2[k]+Q^2[k]}$ of the coarse-grained IQ correlation integrals are calculated. The magnitude of the continuous-time correlation function $|z(\tau)|$ is assumed to be large (e.g. above a threshold) or maximum when $\tau$ is at or near the true delay.

Computation of coarse delay estimate(s) (or "initial estimate of delay values"): At block 240, one or more coarse values of the delay, herein referred to as "initial estimates of delay values," are selected by using one of the following methods. The set of selected values is denoted by $\Sigma'_1$. One method is to choose the single value of $k\Delta$ that maximizes $|z(k\Delta)|$:

$$\Sigma'_1=\{\operatorname{argmax}_{k\Delta}|z(k\Delta)|\}$$

Another method is to select an interval of values around the maximum. One skilled in the art can see how statistical methods can be used to determine the size of this interval given a specified confidence level and suitable statistical assumptions relevant to the exact situation at hand.

Another method is to choose all the values $k\Delta$ for which $|z(k\alpha)|$ is above a threshold b:

$$\Sigma'_1=\{k\Delta:|z(k\Delta)|>b\}.$$

One skilled in the art can see how statistical methods can be used to determine this threshold given a specified confidence level and suitable statistical assumptions relevant to the exact situation at hand.

Fine-grained values of interest (or "range of delay values of interest"): At block 250, a set $\Sigma_2=$ of delay values in the neighborhood of the initial estimate of delay value is selected to represent the new range of delay values of interest. For instance, these values of interest can be chosen to be:

$$\Sigma_2 = \left\{ iP + j\Delta, \quad i = 0, \pm 1, \pm \frac{\Delta}{P}, \quad j\Delta \in \Sigma'_1 \right\} \quad (1)$$

where $j\Delta$ is one of the selected coarse values of the delay, (also referred to as "selected initial estimate of delay value") and P is the desired precision.

Fine-grained interpolation At block 260, fine-grained values for the I and Q correlation integrals are interpolated by using a subset of the coarse-grained calculations of the I and Q correlation integrals. The fine-grained values for the I and Q correlation integrals can then be searched to give rise to fine-tuned estimated delay values. Various interpolation techniques may be used for interpolating the fine-grained I and Q correlation integrals. As one skilled in the art knows, there are a variety of well known interpolation techniques and which one is suitable may vary from implementation to implementation. One such technique is bandlimited interpolation.

If the IQ correlation integral $z(\tau)$ is presumed to have bandwidth $\frac{1}{2}\Delta$ or less viewing delay $\tau$ as the virtual time variable, then the fine-tuned value of the IQ correlation $z(\sigma_2)$, $\sigma_2 \in \Sigma_2$ is computed by interpolating the $\Delta$-spaced samples $z(k\Delta)$ by means of a sinc weighting function:

$$z(\sigma_2) = \sum_{k; |\sigma_2 - k\Delta| < R_1} z(k\Delta) \frac{\sin[\pi(\sigma_2 - k\Delta)/\Delta]}{\pi(\sigma_2 - k\Delta)/\Delta}, \sigma_2 \in \Sigma_2$$

The cutoff value $R_1$ at which the sum is truncated can be determined according to the accuracy desired, as one skilled in the art can readily see. The larger the desired accuracy, the large $R_1$ should be made.

Finally, block 270 selects a set $\Sigma'_2$ of fine-tuned estimates of delay values by using one of the same set of possible methods that could be used in block 240.

Alternatively, the interpolation above could be carried out using the real valued $|z(\tau)|$ rather than the complex $z(\tau)$ if the approximation loss is acceptable.

Template-based Approach

FIG. 3 is a flowchart that illustrates another technique for fine-tuning estimates of delay values and other parameters associated with a received signal. For this technique, it is assumed that the ideal shape of the IQ correlation integral $z(t)$ is known and is represented by a parametric template $S_\mu(t)$ parametrized by $\mu$. When the hypothesized source produces and transmits a signal, the IQ correlation $z[k]$ is assumed to contain an image of the template $S_\mu$ given by $S_\mu(t-\sigma)$, where $\sigma$ is the delay. The observed IQ correlation integral $z(t)$ is modeled to be $$z(t) = S_\mu(t-\sigma) + \text{noise}.$$

The parameters of the template (other than the delay), denoted collectively by the symbol $\mu$, account for the variability in the received signal due to a variety of modeled phenomena, which may include signal attenuation, frequency shifts, and multipath propagation. For example, the IQ correlation integral for GPS signals in the presence of multipath contains the interaction of two or more low-passed triangular waveforms that are scaled and shifted with respect to each other by amounts that vary in a continuum of possible values. Other variability is due to some signal processing parameters (such as the bandwdith of certain filters) that are known for the particular signal being processed but can vary between signals.

One form for the template that is considered:

$$S_\mu(t-\sigma) = A_1 S_\theta^{(1)}(t-\sigma) + \ldots + A_N S_\theta^{(N)}(t-\sigma),$$

where the parameter $\mu$ comprises both the linear parameters $A_1, \ldots, A_N$ and the remaining nonlinear parameters (other than the delay $\sigma$) $\theta$.

The template-matching approach consists in finding estimates of the parameters for which the total weighted square error $$\lambda_\mu(\sigma) = \sum_k \omega_\mu(k\Delta - \sigma)|z(k\Delta) - S_\mu(k\Delta - \sigma)|^2$$

is small or minimal. The weights $w_\mu$, which are optional and could just be set to 1, can be used to emphasize certain portions of the template which are known to be more reliable or important for the specific situation at hand.

The description of the template-matching approach is as follows.

At block 310 of FIG. 3, a parametric family of templates $S_\mu(t)$, $\mu \in M$ is chosen. If weights are used, a weighting function $w_\mu$ for each parameter $\mu \in M$ is constructed. Block 310 can be executed off-line. More details about this block are in the section entitled "Template construction".

Block 320 determines a coarse set of delay values (also referred to as "initial estimates of delay values"), $\Sigma_1$, and non-linear parameters, $\Theta_1$, which presumably contain a good approximation to the unknown value of the parameter $\theta$ and delay $\sigma$. A loop is initiated that hypothesizes each of these values and control is passed to Block 330.

Block 330 performs a linear regression to estimate the linear parameters $\underline{A} = (A_1, \ldots, A_N)$ that minimize the weighted square error for each of the hypothesized non-linear parameter $\theta_1$ and delay values $k\Delta$. For instance, if there is only one linear parameter, $$A(k\Delta, \theta_1) = \frac{\sum_{k'} \omega_\mu(k'\Delta - j\Delta) S_{\theta_1} * (k'\Delta - j\Delta) z[k']}{\sum_{k'} \omega_\mu(k'\Delta)|S_{\theta_1}(k'\Delta)|^2},$$

$$k\Delta \in \Sigma_1, \theta_1 \in \Theta_1.$$

Block 340 selects a subset of the hypothesized coarse values of the delay (also referred to as "selected initial estimates of delay values") and other nonlinear parameters according to the value of the minimum total weighted square error $\lambda(k\Delta, \theta_1)$, equal to the total weighed square error $\lambda_\mu(k\Delta)$ minimized over all linear parameters $\underline{A}$.

One method is to choose the value of these parameters that minimizes $\lambda(k\Delta, \theta_1)$.

Another method is to select a range of values around the minimim and represent them by an uncertainty interval. One skilled in the art can see how a statistical method can be used to determine the size of this interval given a specified confidence level and suitable statistical assumptions relevant to the exact situation at hand.

Another method is to choose all the values for which $\lambda(k\Delta, \theta_1)$ is below a threshold. One skilled in the art can see how a statistical method can be used to determine the threshold given a specified confidence level and suitable statistical assumptions relevant to the exact situation at hand.

The selected subsets of coarse delays (also referred to as "selected initial estimates of delay values") and nonlinear parameters is denoted $\Sigma'_1$ and $\Theta'_1$.

Block 350 selects a fine-tuned range of delay values that are also referred to as a "range of delay values of interest", and nonlinear parameters in the neighborhood of each selected coarse value (i.e., of each "selected initial estimate of delay values"). For example, the following fine-grained values of the delay (i.e., "range of delay values of interest") can be considered:

$$\sum\nolimits_{2} = \left\{ iP + k\Delta, \quad i = 0, \pm 1, \pm \frac{\Delta}{P}, \quad k\Delta \in \Sigma'_1 \right\}.$$

Block 360 is analogous to block 330, but is performed on the fine-grained set of delay values (range of delay values of interest) and nonlinear parameters. However, since the hypothesized values are much closer to each other, one can obtain significant computational savings by using an interpolation technique whenever the underlying functions are sufficiently smooth.

For example, in the case when there is only one linear parameter A, and a bandlimited assumption is valid, then an interpolation method similar to the one used in block 260 can be used:

$$A(\theta, \sigma_2) = \sum_k A(\theta, k\Delta) \frac{\sin[\pi(\sigma_2 - k\Delta)/\Delta]}{\pi(\sigma_2 - k\Delta)/\Delta}, \qquad \sigma_2 \in \Sigma_2$$

If the bandlimited assumption is not valid, then one needs to solve the linear regression problem for each of the hypothesized fine-grained values and search over the results. For example, $$A(\theta, \sigma_2) = \frac{\sum_k \omega_\mu(k\Delta - \sigma_2) S^*_\theta(k\Delta - \sigma_2) z[k]}{\sum_k \omega_\mu(k\Delta - \sigma_2) |S_\theta(k\Delta - \sigma_2)|^2}, \quad \sigma_2 \in \Sigma_2 \quad (2)$$

This computation is done in slightly different ways depending on whether the template $\mu$ and the weights $w_\mu$ are encoded by an analytical expression or by a table. One skilled in the art can implement a system to evaluate the expression (2) and search for an estimate in a satisfactory way according to the relevant constraints and requirements by means of exhaustive search, divide-and-conquer, gradient descent, Newton's method, and a host of other optimization techniques.

One skilled in the art will also see that in a small neighborhood of a nominal value for a nonlinear parameter, the effect of that parameter on the template can be well approximated by a linear term using a Taylor expansion. Such a method can be used to help aid the search over some of the otherwise nonlinear parameters in small local neighborhoods. One skilled in the art can use this to speed up the search even further by linearizing nonlinear parameters based on the neighborhoods in question.

For certain types of templates, it is possible to estimate the delay and amplitude of the template by means of an exact N-point fitting of the function $S_\mu(t-\sigma)$ to the observed IQ correlation integral. This is accomplished by solving the system of N nonlinear equations $$S_\mu(k\Delta - \sigma) = z(k\Delta), \ k = j_1, j_1 + N,$$

whose unknowns are the delay $\sigma$, and the N−1 unknown parameters in $\mu$ of the template. One skilled in the art will notice that the although the above equations are written for a sequential set of correlation integrals, the N equations can also be made from any set of N observed correlation integrals.

An important application of this method is to searching for an estimate for the exact modulation frequency parameter $\bar{f}$. The analogous calculations are performed, but with the search over the delay parameter $\sigma$ replaced with a search over the modulation frequency f. The equations are $$S_\mu(k\Delta - \bar{f}) = z(k\Delta), \ k = j', j'+1,$$

where $\Delta$ is now a frequency interval and the template $S_\mu(f)$ can be taken equal to the expression $$S_\mu(f) = A \frac{\sin^2[\pi f/\Delta]}{\pi^2 f^2/\Delta^2}.$$

In this particular choice of template for estimating the frequency, the unknown parameters are just the amplitude A and the $\bar{f}$ representing the true modulating frequency. This template is an approximation to the case where the underlying correlation sums are taken over a large number of data points. Other templates might be suitable if the underlying correlation sums are computed differently.

Block 370 is exactly analogous to block 340.

Template Construction

In one embodiment of this invention, which calculates delay estimates of a GPS signal, the basic template is obtained by convolving the appropriately lowpass filtered PRN code (i.e. the appropriate PRN code filtered by the lowpass filter $H_{W,\alpha}$) with itself. This basic template will be denoted $g_{W,\alpha}$ $$S_\mu(t-\sigma) = A g_{W,\alpha}(t-\sigma).$$

The parameter W denotes the bandwidth of the filter and $\alpha$ denotes other parameters that describe the shape of the filter. The template has roughly the shape of a rounded triangular peak with a few smaller peaks on the sides.

Among the causes that affect the shape and bandwidth of the filter H.sub.w,.slphs. are the duration of the correlation integrals, the properties of the A/D converter (and filters therein), and the nature of the approximations during the calculations of the correlation integrals (As those in U.S. patent application Ser. No. 09/888,228, filed on the same day herewith, entitled "Signal Acquisition Using Data Bit Information", by inventors Anant Sahai, Wallace Mann, Andrew Chou and Benjamin Van Roy, now U.S. Pat. No. 6,512,479, and U.S. patent application Ser. No. 09/888,227, filed on the same day herewith, entitled "Synthesizing Coherent Correlation Sums at One or Multiple Carrier Frequencies Using Correlation Sums Calculated at a Coarse Set of Frequencies", by inventors Anant Sahai and John Tsitsiklis, In more sophisticated embodiments designed to achieve robustness to multipath phenomena, a composite template is constructed out of two or more basic templates. For example, a template with two components is obtained by summing one basic template corresponding to the direct path of propagation and one associated with a reflected path:

$$S_\mu(t-\sigma)=A_1 g_{W,\alpha}(t-\sigma)+A_2 g_{W,\alpha}(t-\sigma-\sigma').$$

Here, $\sigma'$ is the delay of the reflected waveform relative to the direct waveform and $A_1$, $A_2$ represent the complex amplitudes of the two components of the signal.

In general, the parameters that characterize the templates are of two different types: specified parameters and searched parameters. For the two-composite templates just described, $W,\alpha$ are specified parameters and $A_1, A_2$, $\sigma$, $\sigma'$ are searched parameters. The specified parameters are known or selected in advance of the application of this invention, whereas the searched parameters and the image parameters are estimated by means of the processing described by the system in FIG. 3.

Whereas the delay is often the main parameter of interest, many embodiments of the invention can utilize also one of more of the other estimated parameters. The exact Doppler shift of the signal is one other such parameter. One skilled in the art will see that with estimating Doppler, an added consideration is the duration of the received signal that is being correlated. The longer the duration, the more finely spaced in Doppler one needs to have even the coarse-grained points for the estimates to be reliable. One skilled in the art will see that the application of the template fitting approach is not limited to extracting parameters of interest. The goodness of the fit or likelihood can also be used to determine whether the modeled phenomena accurately explain the observed data. For example, even with no explicit modeling of multipath phenomena, the presence of multipath can sometimes be detected by noticing that the goodness of the fit is poor. In such cases, the overal system can take advantage of this information by discounting estimates that come from data which is known to be poorly modeled.

In some embodiments of the invention, the weights $w_\mu$ are not used (or equivalently set equal to one). In others, the weights are chosen so as to emphasize the more reliable or significant portions of the template. One skilled in the art will notice that the early portion of a basic template is more reliable because it is less affected by reflected paths. In some embodiments, the weighting function $w_\mu(t)$ is set equal to 1 for $t<t_0$, and equal to 0 for $t \geq t_0$. The details of how $w_\mu(t)$ is chosen can be determined according to the particular situation, as one skilled in the art can see.

In some embodiments of the invention, an analytical expression of the signature template and/or the weighting function is used. In certain cases, these analytical expressions can be used to fit directly the template to the received signal. Alternatively, one skilled in the art can use these analytical expressions to implement an input/output algorithm that returns the value of the template and/or the weighting function at particular values. In other embodiments, the template and weighting functions are pre-computed and stored in a tabular database that can significantly reduce the amount of time required to carry out the calculations. One skilled in the art can easily determine whether an analytical or a tabular approach is more appropriate to the situation at hand, and such decision can even be made at run-time automatically by suitable automated logic.

Hardware Overview

Figure 4:
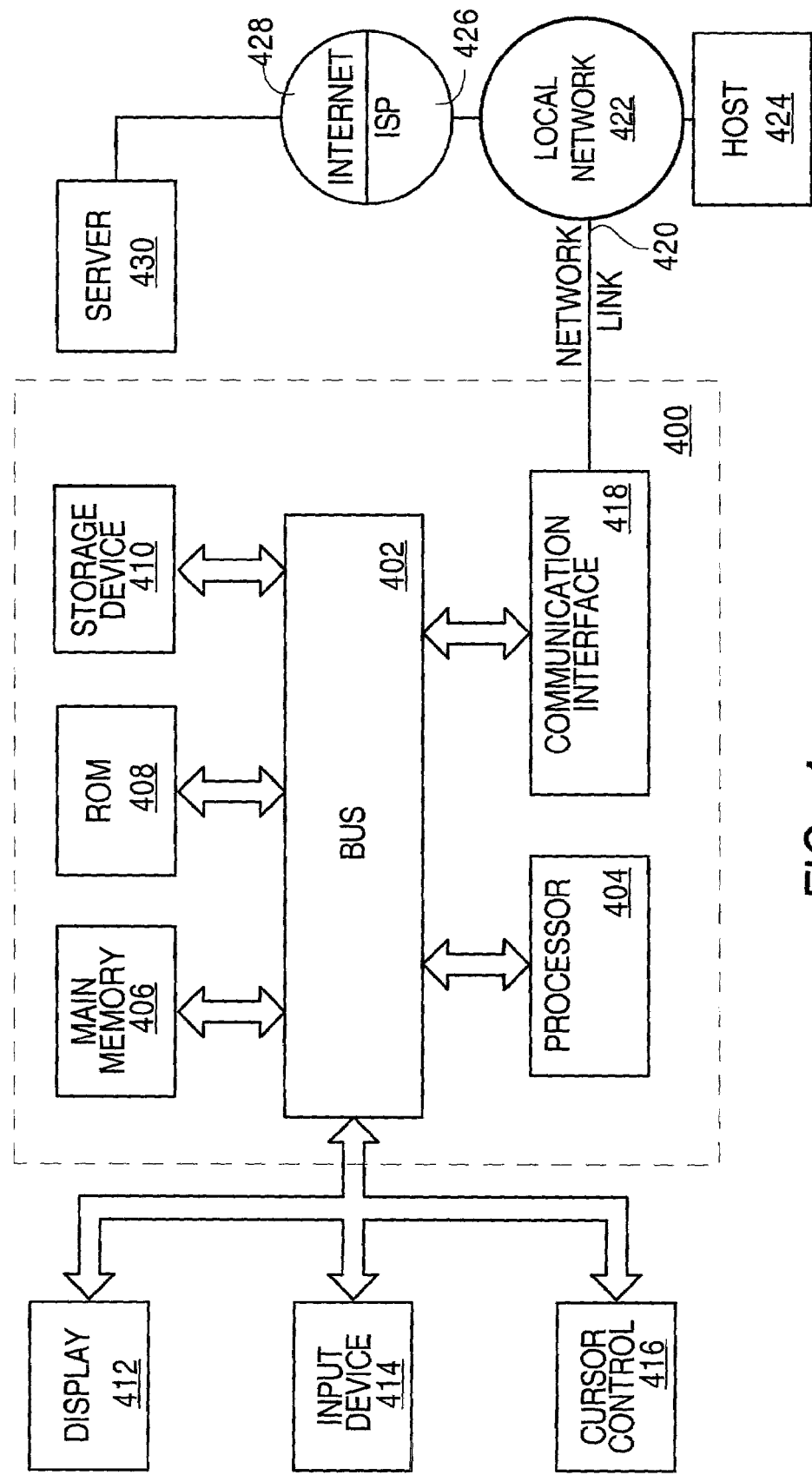
FIG. 4 is a block diagram illustrating a computer system on which embodiments of the invention may be implemented.

An embodiment of the invention may be implemented using a computer system that includes a processor for processing information. One example of such an implementation is discribed in the following and illustrated in FIG. 4. The Computer system also includes a main memory, such as a random access memory (RAM) or other dynamic storage device, coupled to a bus for storing information and instructions to be executed by the processor. The main memory also may be used for storing temporary variables or other intermediate information during execution of instructions to be executed by the processor. The computer system further includes a read only memory (ROM) or other static storage device coupled to the bus for storing static information and instructions for the processor. A storage device, such as a magnetic disk or optical disk, is provided and coupled to the bus for storing information and instructions.

The invention is related to the use of the computer system for implementing the techniques described herein. According to one embodiment of the invention, those techniques are implemented by the computer system in response to the processor executing one or more sequences of one or more instructions contained in main memory. Such instructions may be read into the main memory from another computer-readable medium, such as the storage device. Execution of the sequences of instructions contained in the main memory causes the processor to perform the process steps described herein. One or more processors in a multi-processing arrangement may also be employed to execute the sequences of instructions contained in the main memory. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor for execution. Such a medium may take many forms, including but not limited to, non-volatile media, volatile media, and transmission media. Non-volatile media includes, for example, optical or magnetic disks, such as the storage device. Volatile media includes dynamic memory, such as the main memory. Transmission media includes coaxial cables, copper wire and fiber optics, including the wires that comprise the bus. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on the storage device either before or after execution by the processor.

The computer system also includes a communication interface coupled to the bus. The communication interface provides a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, the communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the communication interface, which carry the digital data to and from the computer system, are exemplary forms of carrier waves transporting the information.

The computer system can send messages and receive data, including program code, through the network(s), the network link and the communication interface. In the Internet example, a server might transmit a requested code for an application program through the Internet, the ISP, the local network and the communication interface. In accordance with the invention, one such downloaded application implements the techniques described herein.

The received code may be executed by the processor as it is received, and/or stored in the storage device, or other non-volatile storage for later execution. In this manner, the computer system may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining one or more fine-tuned estimates of delay value associated with a received signal, the method comprising the computer-implemented steps of:
   determining a range of delay values of interest associated with the received signal;
   interpolating fine-grained values for in-phase (I) and Quadrature (Q) correlation integrals by using a subset of coarse-grained calculations of I and Q correlation integrals; and
   determining the one or more fine-tuned estimates of delay value based on the fine-grained values of I and Q correlation integrals.

2. The method of claim 1, wherein determining a range of delay values of interest further comprises the steps of:
   determining one or more initial estimates of the delay value;
   selecting one of the one or more initial estimates of delay value to be a selected initial estimate of delay value; and
   selecting a range of delay values in the neighborhood of the selected initial estimate of delay value to be the range of delay values of interest.

3. The method of claim 2, wherein selecting a range of delay values in the neighborhood of the selected initial estimate of delay value to be the range of delay values of interest is a function of the selected initial estimate of delay value and a pre-selected confidence level.

4. The method of claim 1, wherein the subset of coarse-grained calculations of I and Q correlation integrals is based on:
   a pre-selected desired accuracy; and
   a type of filter that was used to filter the received signal.

5. The method of claim 2, wherein determining the one or more initial estimates of the delay value further comprises the steps of:
   performing, if not already performed, a coarse-grained calculation of I and Q correlation integrals over a hypothesized range of delay values for a sampled data that is associated with the received signal;
   calculating magnitude values corresponding to the coarse-grained calculations of I and Q correlation integrals over the hypothesized range of delay values; and
   selecting a delay value that corresponds to a highest magnitude value corresponding to the coarse-grained calculations of I and Q correlation integrals as the one or more initial estimates of delay value.

6. The method of claim 2, wherein determining the one or more initial estimates of delay value further comprises the steps of:
   performing, if not already performed, a coarse-grained calculation of I and Q correlation integrals over a hypothesized range of delay values for a sampled data that is associated with the received signal;
   calculating magnitude values corresponding to the coarse-grained calculations of I and Q correlation integrals over the hypothesized range of delay values; and
   selecting one or more delay values that correspond to magnitude values that are above a pre-selected threshold magnitude value as the one or more initial estimates of delay value.

7. The method of claim 2, wherein determining the one or more initial estimates of the delay value further comprises the steps of:
   performing, if not already performed, a coarse-grained calculation of I and Q correlation integrals over a hypothesized range of delay values for a sampled data that is associated with the received signal;
   calculating magnitude values corresponding to the coarse-grained calculations of I and Q correlation integrals over the hypothesized range of delay values;

determining a highest magnitude value corresponding to the coarse-grained calculations of I and Q correlation integrals; and selecting one or more delay values that correspond to magnitude values that are within a pre-selected magnitude range around the highest magnitude value as the one or more initial estimates of delay value.

8. The method of claim 5, wherein the hypothesized range of delay values is based on:
   an approximate time when a receiver received the received signal; and
   a time uncertainty quantity that is associated with the approximate time.

9. The method of claim 1, wherein interpolating fine-grained values for I and Q correlation integrals is based on a bandlimited interpolation technique.

10. The method of claim 1, wherein the received signal is associated with a global positioning satellite vehicle.

11. The method of claim 1, wherein determining the one or more fine-tuned estimates delay value based on the fine-gained values of I and Q correlation integrals comprises the steps of:
   calculating magnitude values corresponding to the fine-gained values of I and Q correlation integrals over the range of delay values of interest; and
   selecting one or more delay values that corresponds to a highest magnitude value corresponding to the fine-gained values of I and Q correlation integrals as the one or more fine-tuned estimates delay value.

12. The method of claim 1, wherein determining one or more fine-tuned estimates delay value based on the fine-gained values of I and Q correlation integrals comprises the steps of:
   calculating magnitude values corresponding to the fine-gained values of I and Q correlation integrals over the range of delay values of interest; and
   selecting one or more delay values that correspond to magnitude values that are above a pre-selected threshold magnitude value as the one or more fine-tuned estimates of delay value.

13. The method of claim 1, wherein determining one or more fine-tuned estimates delay value based on the fine-grained values of I and Q correlation integrals comprises the steps of:
   calculating magnitude values corresponding to the fine-grained values of I and Q correlation integrals over the range of delay values of interest;
   determining a highest magnitude value corresponding to the fine-grained values of I and Q correlation integrals; and
   selecting one or more delay values that corresponds to magnitude values that are within a pre-selected magnitude range around the highest magnitude value as the one or more fine-tuned estimates of delay value.

14. A method for determining one or more fine-tuned estimates of delay value associated with a received signal, the method comprising the computer-implemented steps of:
   performing, if not already performed, a coarse-grained calculation of in-phase (I) and Quadrature (Q) correlation integrals over a hypothesized range of delay values for a sampled data that is associated with the received signal;
   calculating a magnitude of the coarse-grained calculations of I and Q correlation integrals over the hypothesized range of delay values; and
   selecting a delay value from the hypothesized range of delay values that correspond to a highest magnitude value that corresponds to the coarse-grained calculations of I and Q correlation integrals as an initial estimate of delay value;
   selecting a range of delay values in the neighborhood of the initial estimate of delay value to be a range of delay values of interest;
   interpolating fine-grained values for I and Q correlation integrals by using a subset of coarse-grained calculations of I and Q correlation integrals;
   calculating magnitude values corresponding to the fine-grained values of I and Q correlation integrals over the range of delay values of interest; and
   selecting one or more delay values that corresponds to a highest magnitude value corresponding to the fine-grained values of I and Q correlation integrals as the one or more fine-tuned estimates delay value.

15. A method for determining one or more fine-tuned estimates of delay value associated with a received signal, the method comprising the computer-implemented steps of:
   determining an initial range of delay values of interest associated with the received signal;
   performing, if not already performed, a coarse-grained calculation of I and Q correlation integrals over the initial range of delay values for a sampled data that is associated with the received signal;
   calculating a magnitude of the coarse-grained calculations of I and Q correlation integrals over the hypothesized range of delay values; and
   selecting a delay value from the hypothesized range of delay values that correspond to a highest magnitude value that corresponds to the coarse-grained calculations of I and Q correlation integrals as an initial estimate of delay value;
   selecting a range of delay values in the neighborhood of the initial estimate of delay value to be a range of delay values of interest;
   generating a parametric template that represents I and Q correlation integrals associated with the received signal; and
   performing a linear regression on the range of delay values of interest to produce a delay error function that is based on the range of delay values of interest; and
   selecting from the range of delay values of interest one or more delay values that minimize the delay error function as the fine-tuned estimates of delay value.

16. The method of claim 15, wherein the step of selecting from the range of delay values of interest one or more delay values that minimize the delay error function comprise the steps of:
   from the range of delay values of interest, selecting a target delay value that produces a minimum value of the delay error function; and
   from the range of delay values of interest, selecting a range of delay values around the target delay value as the one or more fine-tuned estimates of delay value.

17. The method of claim 15, wherein the step of selecting from the range of delay values of interest one or more delay values that minimize the delay error function comprises the steps of:
   selecting from the range of delay values of interest one or more delay values for which the delay error function is below a pre-selected threshold value of the delay error function as the one or more fine-tuned estimates delay value.

18. A method for determining one or more fine-tuned estimates of carrier frequency value associated with a received signal, the method comprising the computer-implemented steps of:
  determining a range of carrier frequency values of interest associated with the received signal;
  interpolating fine-grained values for in-phase (I) and Quadrature (Q) correlation integrals by using a subset of coarse-grained calculations of I and Q correlation integrals; and
  determining the one or more fine-tuned estimates of carrier frequency value based on the fine-grained values off and Q correlation integrals.

19. The method of claim 18, wherein determining a range of can-icr frequency values of interest further comprises the steps of:
  determining one or more initial estimates of carrier frequency value;
  selecting one of the one or more initial estimates of carrier frequency value to be a selected initial estimate of carrier frequency value; and
  selecting a range of carrier frequency values in the neighborhood of the selected initial estimate of carrier frequency value to be the range of carrier frequency values of interest.

20. The method of claim 18, wherein the subset of coarse-grained calculations off and Q correlation integrals is based on:
  duration of the I and Q correlation integral;
  a pre-selected confidence level; and
  a type of filter that was used to filter the received signal.

21. The method of claim 19, wherein determining the one or more initial estimates of carrier frequency value further comprises the steps of:
  performing, if not already performed, a coarse-grained calculation of I and Q correlation integrals over a hypothesized range of carrier frequency values for a sampled data that is associated with the received signal;
  calculating magnitude values corresponding to the coarse-grained calculations of I and Q correlation integrals over the hypothesized range of carrier frequency values; and
  selecting a carrier frequency value that corresponds to a highest magnitude value corresponding to the coarse-grained calculations of I and Q correlation integrals as the one or more initial estimates of carrier frequency value.

22. The method of claim 19, wherein determining the one or more initial estimates of carrier frequency value further comprises the steps of:
  performing, if not already performed, a coarse-grained calculation of I and Q correlation integrals over a hypothesized range of carrier frequency values for a sampled data that is associated with the received signal;
  calculating magnitude values corresponding to the coarse-grained calculations of I and Q correlation integrals over the hypothesized range of carrier frequency values; and
  selecting one or more carrier frequency values that correspond to magnitude values that are above a pre-selected threshold magnitude value as the one or more initial estimates of carrier frequency value.

23. The method of claim 19, wherein determining the one or more initial estimates of carrier frequency value further comprises the steps of:
  performing, if not already performed, a coarse-grained calculation of I and Q correlation integrals over a hypothesized range of carrier frequency values for a sampled data that is associated with the received signal;
  calculating magnitude values corresponding to the coarse-grained calculations of I and Q correlation integrals over the hypothesized range of carrier frequency values;
  determining a highest magnitude value corresponding to the coarse-grained calculations of I and Q correlation integrals; and
  selecting one or more carrier frequency values that correspond to magnitude values that are within a pre-selected magnitude range around the highest magnitude value as the one or more initial estimates of carrier frequency value.

24. The method of claim 18, wherein the received signal is associated with a global positioning satellite vehicle.

25. The method of claim 18, wherein determining the one or more fine-tuned estimate of carrier frequency value based on the fine-grained values of I and Q correlation integrals comprises the steps of:
  calculating magnitude values corresponding to the fine-grained values of I and Q correlation integrals over the range of carrier frequency values of interest; and
  selecting one or more carrier frequency value that correspond to a highest magnitude value corresponding to the fine-grained values of I and Q correlation integrals as the one or more fine-tuned estimates carrier frequency value.

26. The method of claim 18, wherein determining one or more fine-tuned estimates of carrier frequency value based on the fine-grained values of I and Q correlation integrals comprises the steps of:
  calculating magnitude values corresponding to the fine-grained values of I and Q correlation integrals over the range of carrier frequency values of interest; and
  selecting one or more carrier frequency values that correspond to magnitude values that are above a pre-selected threshold magnitude value as the one or more fine-tuned estimates carrier frequency value, respectively.

27. The method of claim 18, wherein determining one or more fine-tuned estimates of carrier frequency value based on the fine-grained values of I and Q correlation integrals comprises the steps of:
  calculating magnitude values corresponding to the fine-grained values of I and Q correlation integrals over the range of carrier frequency values of interest;
  determining a highest magnitude value corresponding to the fine-grained values of I and Q correlation integrals; and
  selecting one or more carrier frequency values that correspond to magnitude values that are within a pre-selected magnitude range around the highest magnitude value as the one or more fine-tuned estimates carrier frequency value.

28. A method for determining one or more fine-tuned estimates of carrier frequency value associated with a received signal, the method comprising the computer-implemented steps of:
  performing, if not already performed, a coarse-grained calculation of in-phase (I) and Quadrature (Q) correlation integrals over a hypothesized range of carrier frequency values for a sampled data that is associated with the received signal;
  calculating a magnitude of the coarse-grained calculations of I and Q correlation integrals over the hypothesized range of carrier frequency value; and selecting a carrier frequency value from the hypothesized range of carrier frequency value that correspond to a highest magnitude value that corresponds to the coarse-grained calculations of I and Q correlation integrals as an initial estimate of earner frequency value;

selecting a range of earner frequency values in the neighborhood of the initial estimate of carrier frequency value to be a range of carrier frequency values of interest;

interpolating fine-grained values for I and Q correlation integrals by using a subset of coarse-grained calculations of I and Q correlation integrals;

calculating magnitude values corresponding to the fine-grained values of I and Q correlation integrals over the range of carrier frequency values of interest; and selecting one or more carrier frequency value that corresponds to a highest magnitude value corresponding to the fine-grained values of I and Q correlation integrals as the one or more fine-tuned estimates carrier frequency value.

29. A method for determining one or more fine-tuned estimates of carrier frequency value associated with a received signal, the method comprising the computer-implemented steps of:

determining an initial range of carrier frequency values of interest associated with the received signal;

performing, if not already performed, a coarse-grained calculation of in-phase (I) and Quadrature (Q) correlation integrals over the initial range of carrier frequency values for a sampled data that is associated with the received signal;

calculating a magnitude of the coarse-grained calculations of I and Q correlation integrals over the hypothesized range of carrier frequency values; and selecting a carrier frequency value from the hypothesized range of carrier frequency values that correspond to a highest magnitude value that corresponds to the coarse-grained calculations of I and Q correlation integrals as an initial estimate of carrier frequency value;

selecting a range of carrier frequency values in the neighborhood of the initial estimate of carrier frequency value to be a range of carrier frequency values of interest;

generating a parametric template that represents I and Q correlation integrals associated with the received signal;

performing a linear regression on the range of carrier frequency values of interest to produce a carrier frequency error function that is based on the range of carrier frequency values of interest; and selecting from the range of carrier frequency values of interest one or more carrier frequency values that minimize the carrier frequency error function as the fine-tuned estimates of carrier frequency value.

30. The method of claim 29, wherein the step of selecting from the range of carrier frequency values of interest one or more carrier frequency values that minimize the carrier frequency error function comprises the steps of:

from the range of carrier frequency values of interest, selecting a target carrier frequency value that produces a minimum value of the carrier frequency error function; and from the range of carrier frequency values of interest, selecting a range of carrier frequency values around the target carrier frequency value as the one or more fine-tuned estimates of carrier frequency value.

31. The method of claim 29, wherein the step of selecting from the range of carrier frequency values of interest one or more carrier frequency values that minimize the carrier frequency error function comprises the steps of:

selecting from the range of carrier frequency values of interest one or more carrier frequency values for which the carrier frequency error function is below a pre-selected threshold value of the carrier frequency error function as the one or more fine-tuned estimates carrier frequency value.

32. A method for determining one or more fine-tuned estimates of parameter values associated with a received signal, the method comprising the computer-implemented steps of:

determining a range of parameter values of interest associated with the received signal;

interpolating fine-grained values for in-phase (I) and Quadrature (Q) correlation integrals by using a subset of coarse-grained calculations of I and Q correlation integrals; and determining the one or more fine-tuned estimates of parameter value based on the fine-grained values of I and Q correlation integrals.

33. The method of claim 32, wherein parameter values comprise a vector including all or a subset of multipath characteristics, signal power, delay, and carrier frequency.

34. The method of claim 32, wherein determining a range of parameter values of interest further comprises the steps of:

determining one or more initial estimates of the parameter value;

selecting one of the one or more initial estimates of parameter value to be a selected initial estimate of parameter value; and selecting a range of parameter values in the neighborhood of the selected initial estimate of parameter value to be the range of parameter values of interest.

35. The method of claim 34, wherein selecting a range of parameter values in the neighborhood of the selected initial estimate of parameter value to be the range of parameter values of interest is a function of the selected initial estimate of parameter value and a pre-selected confidence level.

36. The method of claim 34, wherein determining the one or more initial estimates of the parameter value further comprises the steps of:

performing, if not already performed, a coarse-grained calculation of I and Q correlation integrals over a hypothesized range of parameter values for a sampled data that is associated with the received signal;

calculating magnitude values corresponding to the coarse-grained calculations of I and Q correlation integrals over the hypothesized range of parameter values; and selecting a parameter value that corresponds to a highest magnitude value corresponding to the coarse-grained calculations of I and Q correlation integrals as the one or more initial estimates parameter value.

37. The method of claim 34, wherein determining the one or more initial estimates of parameter value further comprises the steps of:

performing, if not already performed, a coarse-grained calculation of I and Q correlation integrals over a hypothesized range of parameter values for a sampled data that is associated with the received signal;

calculating magnitude values corresponding to the coarse-grained calculations of I and Q correlation integrals over the hypothesized range of parameter values; and selecting one or more parameter values that correspond to magnitude values that are above a pre-selected threshold magnitude value as the one or more initial estimates of parameter value.

38. The method of claim 34, wherein determining the one or more initial estimates of the parameter value further comprises the steps of:
performing, if not already performed, a coarse-grained calculation of I and Q correlation integrals over a hypothesized range of parameter values for a sampled data that is associated with the received signal;
calculating magnitude values corresponding to the coarse-grained calculations of I and Q correlation integrals over the hypothesized range of parameter values;
determining a highest magnitude value corresponding to the coarse-grained calculations of I and Q correlation integrals; and
selecting one or more parameter values that correspond to magnitude values that are within a pre-selected magnitude range around the highest magnitude value as the one or more initial estimates of parameter value.

39. A method for determining one or more fine-tuned estimates of parameter value associated with a received signal, the method comprising the computer-implemented steps of:
determining an initial range of parameter values of interest associated with the received signal;
performing, if not already performed, a coarse-grained calculation of in-phase (I) and Quadrature (Q) correlation integrals over the initial range of parameter values for a sampled data that is associated with the received signal;
calculating a magnitude of the coarse-grained calculations of I and Q correlation integrals over the hypothesized range of parameter values; and
selecting a parameter value from the hypothesized range of parameter values that correspond to a highest magnitude value that corresponds to the coarse-grained calculations of I and Q correlation integrals as an initial estimate of parameter value;
selecting a range of parameter values in the neighborhood of the initial estimate of parameter value to be a range of parameter values of interest;
generating a parametric template that represents I and Q correlation integrals associated with the received signal; and
performing a linear regression on the range of parameter values of interest to produce a parameter error function that is based on the range of parameter values of interest; and
selecting from the range of parameter values of interest one or more parameter values that minimize the parameter error function as the fine-tuned estimates of parameter value.

40. The method of claim 39, wherein the step of selecting from the range of parameter values of interest one or more parameter values that minimize the parameter error function comprises the steps of:
from the range of parameter values of interest, selecting a target parameter value that produces a minimum value of the parameter error function; and
from the range of parameter values of interest, selecting a range of parameter values around the target parameter value as the one or more fine-tuned estimates of parameter value.

41. The method of claim 39, wherein the step of selecting from the range of parameter values of interest one or more parameter values that minimize the parameter error function comprises the steps of:
selecting from the range of parameter values of interest one or more parameter values for which the parameter error function is below a pre-selected threshold value of the parameter error function as the one or more fine-tuned estimates parameter value.

42. In a position determining system, a method for calculating one or more fine-grained estimates, wherein said fine-grained estimates are for a signal parameter, and wherein said signal parameter is for a received signal, the method comprising the steps of:
receiving said received signal at a receiver;
pre-processing said received signal;
obtaining a set of coarse-grained correlations;
determining a set of fine-grained values of interest:
calculating a set of fine-grained correlations by interpolating the coarse-grained correlations, wherein each said fine-grained correlation is for one said fine-grained value of interest; and
determining the one or more fine-grained estimates based on said set of fine-grained correlations.

43. The method of claim 42, wherein determining said set of fine-grained values of interest comprises the steps of:
determining a set of initial estimates for said signal parameter;
determining, based on a pre-selected confidence level, a plurality of ranges of fine-grained values of interest, wherein each said range corresponds to one said initial estimate; and
combining said plurality of ranges to yield said set of fine-grained values of interest.

44. The method of claim 43, wherein calculating said set of fine-grained correlations comprises the steps of:
selecting one said fine-grained value of interest;
determining a subset of coarse-grained correlations from said set of coarse-grained-correlations based on a pre-selected desired accuracy and a type of filter;
interpolating said subset of coarse-grained correlations; and
repeating the above three steps for all the fine-grained values of interest in said set of fine-grained values of interest.

45. The method of claim 44, wherein determining said set of initial estimates further comprises the step of calculating a set of coarse-grained correlation magnitudes.

46. The method of claim 44, wherein determining said set of initial estimates further comprises the step of comparing the set of coarse-grained correlation magnitudes with a pre-selected magnitude threshold.

47. The method of claim 45, wherein determining said set of initial estimates further comprises the step of determining a highest coarse-grained correlation magnitude.

48. The method of claim 47, wherein determining said set of initial estimates further comprises the step of selecting coarse-grained correlation magnitudes that are within a pre-selected magnitude range of said highest coarse-grained correlation magnitude.

49. The method of claim 44, wherein said set of coarse-grained correlations corresponds to a range of coarse hypothesized values for said signal parameter, wherein said range of coarse hypothesized values depends on:
an approximate time when said receiver received said received signal; and a time uncertainty quantity associated with said approximate time.

50. The method of claim 46, wherein said set of coarse-grained correlations corresponds to a range of coarse hypothesized values for said signal parameter, wherein said range of coarse hypothesized values depends on:
an approximate time when said receiver received said received signal; and
a time uncertainty quantity associated with the approximate time.

51. The method of claim 47, wherein said set of coarse-grained correlations corresponds to a range of coarse hypothesized values for said signal parameter, wherein said range of coarse hypothesized values depends on:
an approximate time when said receiver received said received signal; and
a time uncertainty quantity associated with the approximate time.

52. The method of claim 48, wherein said set of coarse-grained correlations corresponds to a range of coarse hypothesized values for said signal parameter, wherein said range of coarse hypothesized values depends on:
an approximate time when said receiver received said received signal; and
a time uncertainty quantity associated with the approximate time.

53. The method of claim 44, wherein calculating said set of fine-grained correlations is based on a band-limited interpolation technique.

54. The method of claim 49, wherein calculating said set of fine-grained correlations is based on a band-limited interpolation technique.

55. The method of claim 50, wherein calculating said set of fine-grained correlations is based on a band-limited interpolation technique.

56. The method of claim 51, wherein calculating said set of fine-grained correlations is based on a band-limited interpolation technique.

57. The method of claim 52, wherein calculating said set of fine-grained correlations is based on a band-limited interpolation technique.

58. The method of claim 42, wherein determining said set of fine-grained estimates further comprises the step of calculating a set of fine-grained correlation magnitudes.

59. The method of claim 58, wherein determining said set of fine-grained estimates further comprises the step of determining a highest fine-grained correlation magnitude.

60. The method of claim 59, wherein determining said set of fine-grained estimates further comprises the step of selecting fine-grained correlation magnitudes that are within a pre-selected magnitude range of said highest fine-grained correlation magnitude.

61. The method of claim 58, wherein determining said set of fine-grained estimates further comprises the step of comparing said set of fine-grained correlation magnitudes with a pre-selected magnitude threshold.

62. In a position determining system, a method for calculating one or more fine-grained estimates, wherein said fine-grained estimates are for a signal parameter, and wherein said signal parameter is for a received signal, the method comprising the steps of:
receiving said received signal at a receiver;
pre-processing said received signal;
obtaining a set of coarse-grained correlations;
determining a set of fine-grained values of interest:
generating a parametric template representing correlation values associated with said received signal;
calculating a weighted square error function by performing a linear regression for each said fine-grained value of interest; and
determining said one or more fine-grained estimates based on said weighted square error function.

63. The method of claim 62, wherein determining said set of fine-grained values of interest comprises the steps of:
determining a set of initial estimates for said signal parameter;
determining, based on a pre-selected confidence level, a plurality of ranges of fine-grained values of interest, wherein each said range corresponds to one said initial estimate; and
combining said plurality of ranges to yield said set of fine-grained values of interest.

64. The method of claim 63, wherein the step of determining said one or more fine-grained estimates comprises the step of determining a lowest weighted square error value.

65. The method of claim 63, wherein the step of determining said one or more fine-grained estimates further comprises the step of comparing said weighted square error function with a pre-selected error threshold.

* * * * *